United States Patent Office 3,548,253  
Patented Dec. 15, 1970

3,548,253  
TIMING CIRCUIT FOR ROTATING PRISM Q-SWITCHED LASERS  
Yosef Alon, Jerusalem, Israel, assignor to Yissum Research Development Company, Jerusalem, Israel, a company of Israel  
Filed Sept. 5, 1968, Ser. No. 757,651  
Int. Cl. H03k 5/153; H05b 41/34  
U.S. Cl. 315—159  
18 Claims

ABSTRACT OF THE DISCLOSURE

A circuit for developing an electronic discharge starting signal which is employed for operating a rotating prism, Q-switched laser. The starting signal which is required in advance of prism alignment is obtained by a single sensor which controls the generation of the desired advance pulses independent of prism rotating speed. The circuit is adjustable to allow for the generation of the starting signals to be initiated within a time interval whose range extends from approximately 0.5 millisecond to 1.5 milliseconds prior to prism alignment, which advance time range is sufficient to fire most high power lasers. Although output pulse of the circuit is sufficient in amplitude and the advance time range of 0.5 to 1.5 msec. will serve most lasers, however, the circuit is not restricted to that range and can easily be adapted to any other advance time range.

---

The present invention relates to laser devices, and more particularly to a novel circuit for initiating discharge in pulsed lasers which employ rotating prism Q-switches wherein the time interval between the starting signal and prism alignment moment is independent of prism rotating speed.

In laser devices of the pulsed laser type, the optical cavity employed therein should be kept lossy during flash tube firing and the device should reach its high Q only some time later, when population inversion reaches its peak, in order to obtain a single high power pulse. Control of optical losses has conventionally been achieved by substituting a total reflection, rotating prism for one of the parallel plane reflectors which form the cavity. Such an arrangement, which is typically referred to as an active Q-switch, provides a low-loss state for a short time, once during each prism revolution, and necessitates the provision for a firing time-signal to precede the prism alignment by the time required for the population inversion build-up.

A light source-sensor combination is usually placed at a constant angle relative to the rotating prism drum in order to provide an electrical time-signal which precedes the prism alignment time by an amount which is dependent upon the aforesaid angle and the rotating speed of the prism drum. Advance time is proportional to the angle and inversely proportional to the rotating speed. Since a constant advance time is desired for optimum laser pulse amplitude, the spinning drum speed must not change from one laser pulse to another.

A system for providing a constant-interval advance signal, which does not depend on drum speed, becomes highly desirable since it allows the use of simple, non-stabilized motor-source combinations. High speed compressed air and D.C. motors can, therefore, be used for drum driving and either prism drum speed or flash advance time can be changed independently for optimum laser pulse power and form.

One proposed method employs light source-detector combinations which are used to determine two prism angle positions. Their output signals are then electronically processed to deliver the desired advance marking pulse.

The present invention has been found to provide better results through the application of a different, single-sensor method which lends itself to a simplified circuit design.

In the present invention, a ramp capacitor is continuously charged by a constant current source. The capacitor is discharged upon prism alignment under control of the sensor and charging is reinitiated after a brief switching duration. A clamp capacitor is provided which follows changes in average prism cycle and adjusts its voltage to different values of the ramp peaks developed by the ramp capacitor. A comparator circuit compares the voltage of the clamp capacitor against a resultant voltage comprised of the ramp voltage and a D.C. signal added to the ramp voltage for the purpose of generating an output signal which precedes prism alignment within a predetermined adjustable range so as to provide sufficient time for population inversion build-up to occur prior to the occurrence of prism alignment and independent of prism rotation. The time interval between signal comparison and ramp peak (prism alignment) is proportional to the amplitude of the D.C. signal added to the ramp voltage, but independent of the discharge cycle.

It is, therefore, one primary object of the present invention to provide a novel circuit which may be used advantageously with laser devices and is capable of providing a firing signal at a time sufficiently prior to prism alignment within the laser structure to allow sufficient population inversion build-up and thereby yield optimum laser pulse amplitude and form.

Another object of this invention is to provide a novel circuit for use in laser devices capable of providing a firing signal at a time sufficiently prior to prism alignment within the laser structure to allow sufficient population inversion build-up and thereby yield optimum laser pulse amplitude, and which is further characterized by generating the desired starting signals independent of prism drum rotating speeds.

Still another object of the present invention is to provide a novel electronic circuit for generating starting signals for laser structures in advance of prism alignment to yield optimum laser pulse amplitude by initiating charging of a ramp capacitor upon prism alignment for developing sawtooth pulses adding a constant value to said pulses and comparing the elevated pulses against the voltage stored in a clamping capacitor which provides the desired advance pulses regardless of changes in prism drum rotating speeds to accurately control the advance time of starting signals relative to prism alignment.

Still another object of the present invention is to provide a novel electronic circuit for generating starting signals for laser structures in advance of prism alignment to yield optimum laser pulse amplitude by initiating charging of a ramp capacitor upon prism alignment for developing sawtooth pulses adding a constant value to said pulses and comparing the elevated pulses against the voltage stored in a clamping capacitor which provides the desired advance pulses regardless of changes in prism drum rotating speeds to accurately control the advance time of starting signals relative to prism alignment; said circuit further employing a single current source for generating both said pulses and said constant value to eliminate the need for stabilizing either the ramp generator or the elevating voltage.

Still another object of the present invention is to provide a novel electronic circuit for generating starting signals for laser structures in advance of prism alignment to yield optimum laser pulse amplitude by initiating charging of a ramp capacitor upon prism alignment for developing sawtooth pulses adding a constant value to said pulses and comparing the elevated pulses against the voltage stored in a clamping capacitor which provides the desired advance pulses regardless of changes in prism drum rotating speeds to accurately control the advance time of starting signals relative to prism alignment; said circuit further employing a single current source for generating both said pulses and said constant value to eliminate the need for stabilizing either the ramp generator or the elevating voltage, and which is further characterized by performing the above functions through the use of a single sensor means.

These as well as other objects of the present invention will become apparent when reading the accompanying description and drawings, in which.

GENERAL TIMING PRINCIPLES

Figure 1:
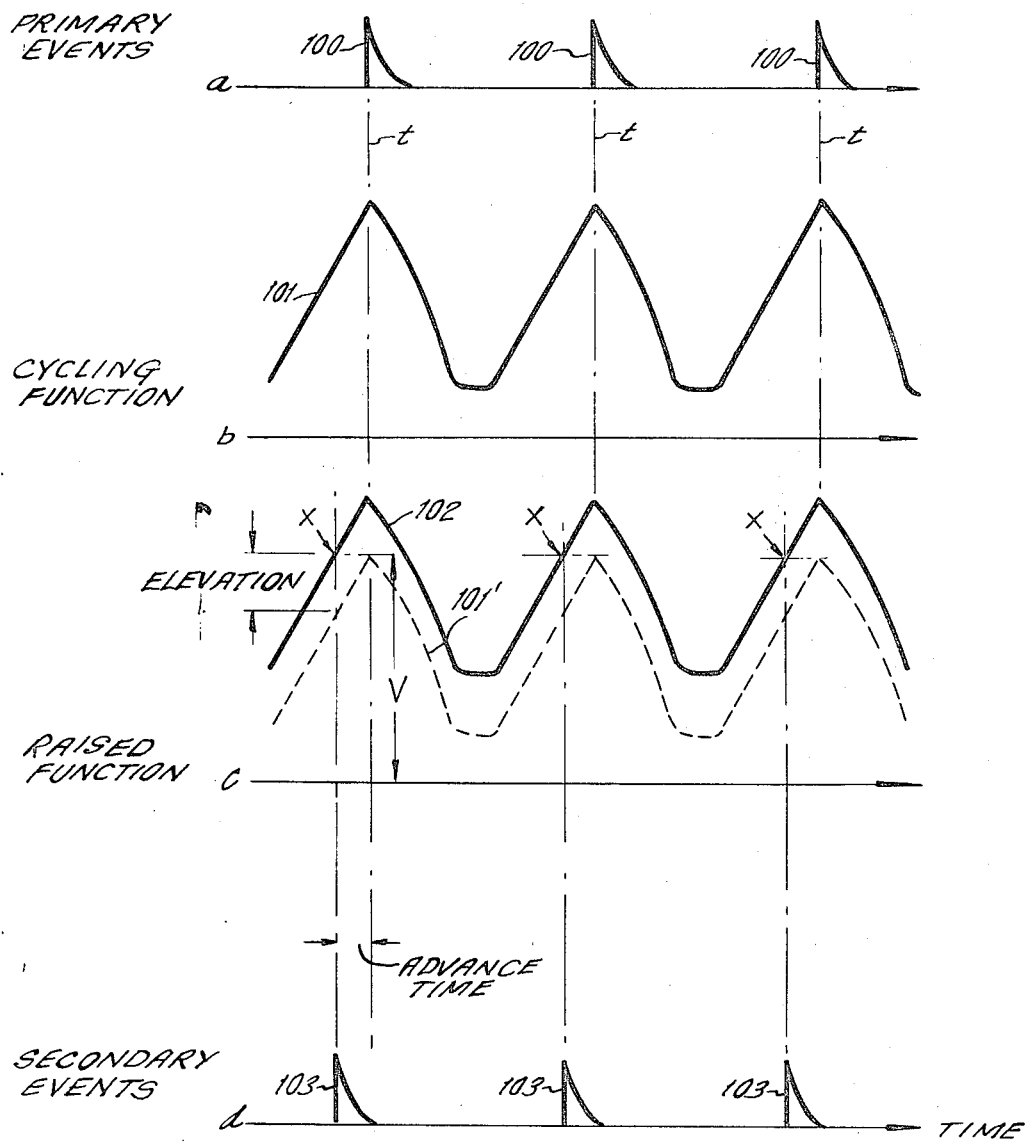
FIG. 1 shows a plurality of waveforms useful in explaining the principles of the invention.

A series of primary events, equally spaced in time, is given and represented by the pulses 100 lying along the "$a$" axis of FIG. 1. The generation of another, secondary series of events, each of which precedes one of the primary events by a controllable amount of time, which does not depend on events repetition rate, is desired.

A quantity 101 is provided which changes repetitively in time so that it will reach a peak at the time $t$ of each primary event and have a linear portion of a constant slope preceding each peak (axis "$b$"). A second quantity is added to the waveform 101 to raise its value (as shown on axis "$c$") by a known amount. This elevated time function 102 will reach and cross the value of the peak of the original unelevated function 101 (shown in dotted fashion) at a certain time on each cycle (point "$x$" on axis "$c$"). This time (referred to as advance time) chosen for generating each of the secondary events 103 (axis "$d$" of FIG. 1). The time interval between each secondary pulse 103 and the appropriate primary one 100 is directly proportional to the value of the second quantity added to the waveform 101 (or 101') and inversely proportional to the slope of the linear portion of the first quantity 101 (or 101'). It does not depend on events repetition rate.

The necessary components for the embodiment of this general principle are:

A function generator for the cycling quantity 101.
A fixed quantity source for function elevation.
A storage for cycling quantity peak value (occurring at each time $t$).
A comparator to generate a secondary pulse when the raised function 102 compares with stored peak value $v$.

FIRST IMPROVEMENT, REGARDING TIMING—INTERVAL STABILITY

Both the slope of the first cycling quantity (waveform 101) and the amount of the second fixed quantity must be stabilized if high timing accuracy is desired. It is possible, however (as will be shown in a practical example to be described), to derive both the slope and the fixed value from a common source, so as to keep them always in proportion, one to each other. Since they have an opposite effect on the advance time, the total influence of their changes on the timing is cancelled and no further stabilization is required.

SECOND IMPROVEMENT REGARDING DYNAMIC OPERATION OF TIMER

For optimum dynamic operation of the timer, the storage means should be made to check and store each peak of the cycling quantity, use the stored value for comparison during each cycle, and reset after the comparison to stand-by for the next peak to be stored. This type of storage means is preferred since the peak value of the cycling quantity does depend on the repetition rate and for proper timing operation, the stored peak level must be adjusted rapidly to the new value if and when the repetition rate changes.

A much simpler storage arrangement may be employed, however, and yield satisfactory results in many applications (as will be shown in a practical example to be described). The storage means can be made to charge by the cycling peak through a unilateral device, and constantly bleed through a controlled leak, so that the stored value would drop in time during the cycle and restore to the peak value at any primary event. The storage means thus can reach its steady state quickly whenever peak values change along with repetition rate. It can be shown that using this type of storage under certain conditions (as in the given example) may result in a timing operation that does not depend on repetition rate. To achieve this, a slightly attenuated form of the cycling quantity should be used for comparison.

APPLYING THE TIMING PRINCIPLE TO ELECTRICAL CIRCUITS

Electrical quantities such as voltage or current may be employed, and electrical or electronical circuits may be used for function generating, mixing and comparing—according to the requirements stated hereinabove. Suitable circuitry can be provided to achieve the improvements explained hereinabove. A large variety of techniques may be applied to such electrical timer design. The cycling quantity, for example, can be generated as a triangular function by integrating the output of a bistable circuit which is driven to change its state at each primary event pulse (obtained by some sensor means). It can be also generated as a current ramp function by applying a constant voltage to an inductor, opening it to discharge the current at each primary even pulse, or else by charging a capacitor through a current source to build up a voltage ramp function, shorting it to discharge its voltage at each primary pulse, etc. More and different techniques can be used for mixing and comparing the various voltage or current function signals.

The timing principle and the improvements explained above are applicable to a specific circuit, which will now be described in detail, which description also includes a mathematical treatment of the timing circuit behavior which applies also to a general case of a ramp function timer based on the principles described above.

Figure 2:
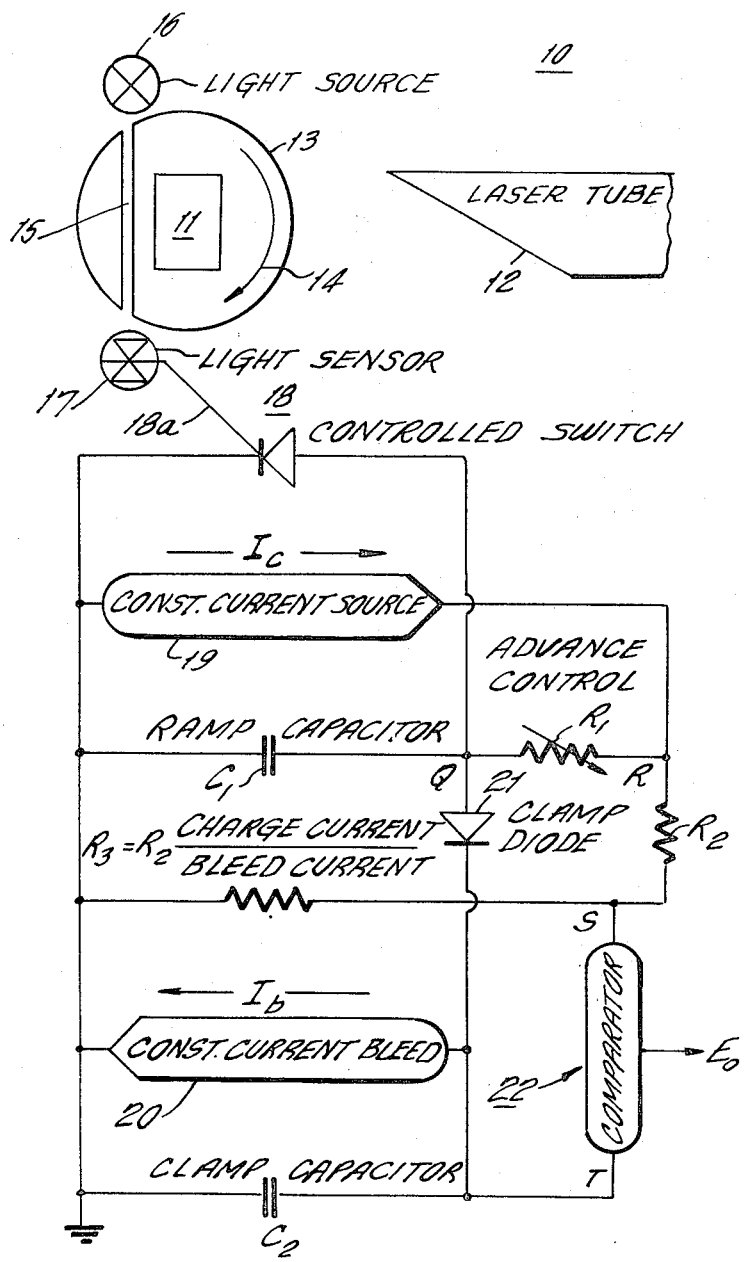
FIG. 2 is a simplified circuit diagram embodying the principles of the present invention.

Laser structures normally employ a pair of parallel plane reflectors at opposite ends of the tube structure. Minimization of optical losses can be achieved by substituting a total reflection, rotating prism 11, shown in the apparatus 10 of FIG. 2, for one of the parallel plane reflectors which form the cavity. The prism is mounted for rotation at one end of a laser tube 12, only a portion of which is shown in FIG. 2 for purposes of simplicity. The prism 11 is mounted upon a rotating prism drum 13 which rotates in the direction shown by arrow 14 (although either direction of rotation is satisfactory). The drum is provided with an opening or other passageway 15 aligned relative to a light source 16 and light-sensitive device 17 so as to permit the passage of light through the guideway 15 when the prism 11 reaches the position of laser alignment. The light passed through guideway 15 activates light-sensor 17 to close switch 18 which may, for example, be a silicon controlled rectifier having a control electrode 18a coupled to the output of light-sensor 17. The closing of switch 18 provides a discharge path for ramp capacitor $C_1$, which is continuously charged by a constant current source 19 which applies constant current $I_c$ to capacitor $C_1$ through an adjustable resistor $R_1$.

Assuming initially that the remainder of the circuit resistors and sources of FIG. 2 are disconnected, a ramp voltage, $V_q = I_c(t-\tau)/C_1$, is developed across $C_1$. This voltage starts to rise after the short switching duration time τ has elapsed, and reaches its peak value, $V_p = I_c(T-\tau)/C_1$, after one complete prism cycle, T, from prism alignment.

The voltage at point R, represented by the symbol $V_R$, has the same form as the ramp voltage at point Q, but is elevated by the constant voltage drop developed across resistor $R_1$. Comparing $V_R$ to the peak ramp voltage $V_p$, which is stored by clamp capacitor $C_2$, we obtain the equation $$I_cR_1 + I_c(t-\tau)/C_1 = I_c(T-\tau)/C_1 \quad (1)$$

which defines the time of equality, $t=t_0$. The time interval between $t_0$ and T is clearly independent of prism rotation, and is given by the equation $$T - t_0 = R_1C_1 \quad (2)$$

This time interval is not affected by switching characteristics and duration changes, since the comparison is made on the upper portion of the waveforms only. The aforesaid time interval is also independent of charging current stability, since the same current employed to determine the charge rate of $C_1$ develops the time advance reference voltage across $R_1$.

A discharge path must be provided for clamp capacitor $C_2$ since it must follow the changes in average prism cycle and adjust its voltage to different values of ramp peaks accordingly. Shunting $C_2$ with a resistor can reduce the adjustment time to the desired value, but such an arrangement destroys the circuit's attractive feature of being totally immune to prism speed changes.

By using a constant current bleed circuit 20 for clamp capacitor $C_2$ to constantly bleed off a current $I_b$ and by comparing the voltage developed across capacitor $C_2$ against a slightly attenuated version of the elevated ramp voltage (at point S), perfect compensation can be achieved, and the circuit characteristics are thereby totally preserved.

Let β be the elevated ramp attenuation constant, and $I_b$ the bleed current of $C_2$, then:

$$V_S = [I_cR_1 + I_c(t-\tau)/C_1]\beta \quad (3)$$

and $$V_T = I_c(T-\tau)/C_1 - I_b t/C_2 \quad (4)$$

The time of equality between $V_S$ and $V_T$ is defined as $t=t_1$. Equating (3) and (4) one gets:

$$\frac{1}{C_1}T - \left(\frac{\beta}{C_1} + \frac{I_b}{I_cC_2}\right)t_1 - \left(\frac{1-\beta}{C_1}\right)\tau = \beta R_1 \quad (5)$$

Now, if β is chosen as: $1 - I_bC_1/I_cC_2$, Equation 5 is reduced to:

$$T - t = \beta R_1 C_1 \left(1 + \frac{C_1}{\beta C_2} \cdot \frac{I_b}{I_c} \cdot \frac{\tau}{R_1 C_1}\right) \quad (6)$$

when $C_1$ is made equal to $C_2$, $I_b \ll I_c$ and $\tau \ll R_1C_1$ one gets: $T - t = \beta R_1 C_1$, and optimum compensation is reached when $R_3/R_2$ is made equal to $I_c/I_b$.

This circuit arrangement permits a quick charge exchange of the clamp storage capacitor. This charge is rapidly adjusted to changes in prism rotational speed, while the advance-time does not depend on prism speed, switching characteristics or duration. The clamp diode 21 of FIG. 2 permits build-up of the voltage across the clamp capacitor $C_2$ to a value substantially equal to the peak of the voltage developed across capacitor $C_1$. When the controlled switch 18 is closed, clamp diode 21 blocks capacitor $C_2$ from being discharged through the circuit branch including controlled switch 18, allowing the capacitor $C_2$ to discharge only so much as is permitted through the constant current bleed circuit 20. When the voltage at terminal S passes the voltage at T, and output signal $E_0$ is developed by the comparator circuit, which signal is a square wave pulse whose leading edge occurs in advance of prism alignment by a time duration sufficient to allow for population inversion build-up within the laser structure.

Figure 3:
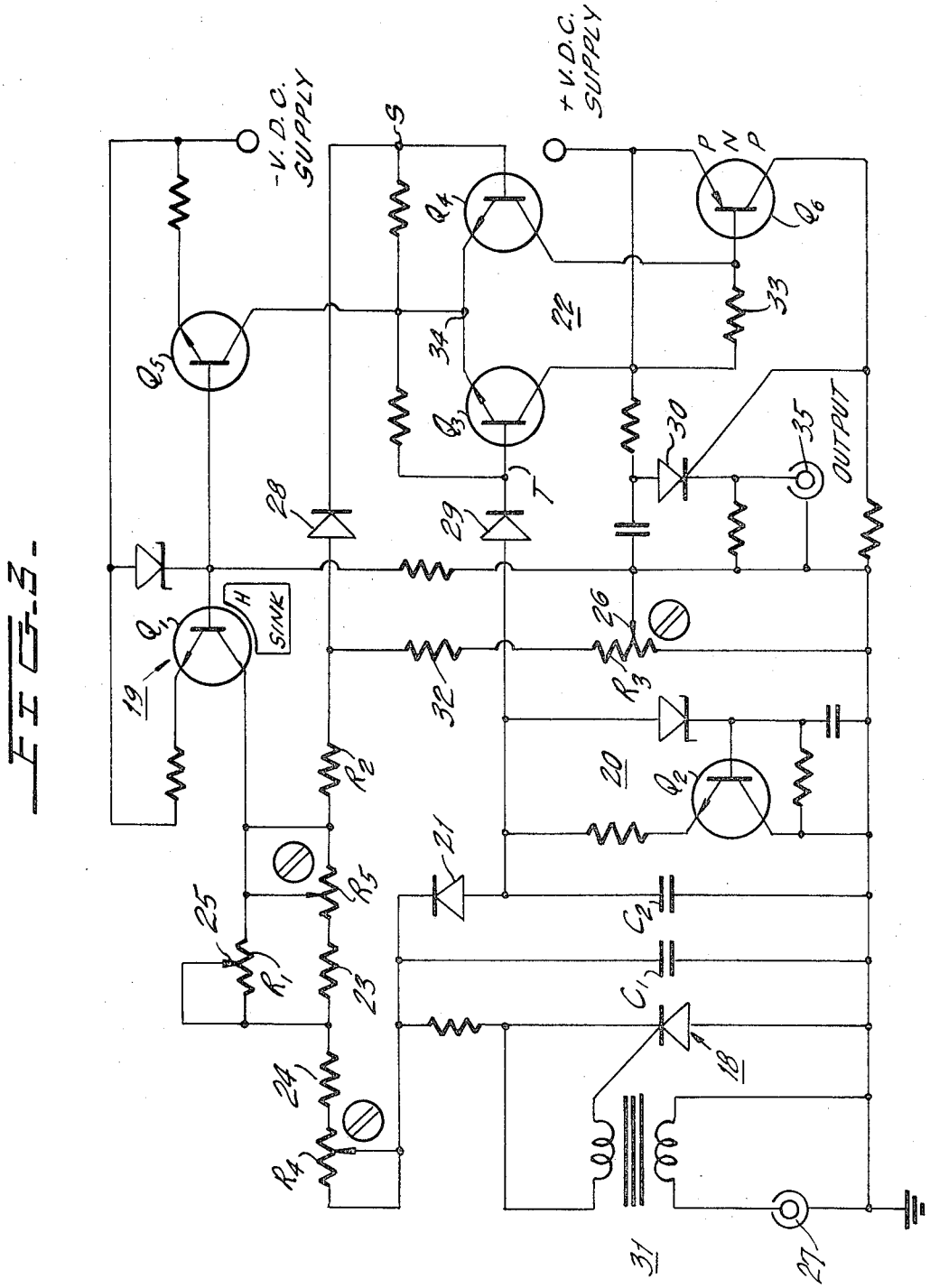
FIG. 3 is a more detailed schematic diagram of the circuitry of FIG. 2.

A more detailed circuit diagram is shown in FIG. 3 wherein like elements are designated by like numerals. The constant current source 19 is comprised of a transistor $Q_1$ which serves as a 10-milliampere constant current source for charging ramp capacitor $C_1$ which is coupled to the collector of transistor $Q_1$ through a path comprised of the resistors 23 and adjustable resistor $R_5$ connected in parallel with adjustable resistor $R_1$, which parallel combination is further connected in series with resistors 24 and adjustable resistor $R_4$. Capacitor $C_1$ is charged at a constant rate of $2.10^4$ volts per second. Adjustable resistor $R_1$ having adjustable arm 25 serves as the operator's control of advance-time. Resistors $R_4$ and $R_5$ adjust the advance-time range extremes to within 0.5 millisecond and 1.5 milliseconds, respectively. Different circuit values can be chosen for different advance-time ranges or different prisms rotation periods, depending only upon the needs of the particular application.

Obviously, the full voltage swing is employed for the purpose of minimizing the effect of the comparator's input voltage drift. At the same time, the highest charging current compatible with rated power dissipation for the particular transistor type used is used to swamp the comparator's input current changes.

The clamp capacitor $C_2$ is charged through the clamp diode 21 so as to be capable of developing substantially the same voltage drop as is developed across ramp capacitor $C_1$ in the same manner as was previously described with regard to FIG. 2. Clamp capacitor $C_2$ is bled by the constant current bleed circuit 20 which is comprised of a transistor stage $Q_2$ which is adjusted to provide a constant bleed current of 20 microamperes.

The ratio $R_3/R_2$ does not follow exactly the rule stated in the previous section. To minimize the effect of repetition rate on advance-time, adjustable resistor $R_3$ having adjustable arm 26 should be adjusted through the employment of a jitter-free pulse generator applied at the circuit's input terminal 27 while monitoring the output with a double time-base oscilloscope.

The comparator 22 is comprised of transistors $Q_3$ and $Q_4$ which operate as a differential pair. Diodes 28 and 29 protect the input junction of the non-conducting unit from breakdown. A third transistor $Q_5$ operates as a constant current generator which maintains a constant current through the common emitter electrodes of transistor pair $Q_3$–$Q_4$, to provide a constant, minimal input current when the input's comparison level changes along with the prism rotation period. Transistor $Q_6$ amplifies the comparator's square wave signal, and feeds the positive going edge thereof (from its collector electrode) to the control electrode of the silicon controled rectifier 30 employed as the output stage. The negative going edge of the pulse is derived from the ramp flyback during input switching, and it does not affect the output signal.

Briefly summarizing, the operation of the circuit of FIG. 3 is as follows:

Assuming steady state operating conditions, i.e., assuming that a number of cycles have occurred sufficient to charge capacitor $C_2$, the prism alignment activates the light-sensor 17 of FIG. 2 which causes a pulse to be applied to input terminal 27 of FIG. 3. This pulse is applied through a transformer 31 which, in turn, triggers the silicon controlled rectifier 18 to be closed and thereby serving as the discharge path for capacitor $C_1$. Clamp capacitor $C_2$ is prohibited from discharging through this path due to the reverse polarity of clamp diode 21, and thereby discharges at a constant current rate established by transistor $Q_2$. The silicon controlled rectifier when open-circuited, allows capacitor $C_1$ to be charged at a constant current rate established by transistor $Q_1$. The elevated voltage drop comprised of the drop across capacitor $C_1$ and the resistors connected between the collector electrode of transistor $Q_1$ and capacitor $C_1$ is coupled to the input terminal S of the comparator circuit 22 by means of the voltage divider comprised of resistors $R_2$, adjustable resistor $R_3$ and resistor 32. The voltage deveeloped across clamp capacitor $C_2$ is coupled to the input terminal T of comparator circuit 22 through diode 29. The elevated and attenuated voltage drop is coupled to terminal S of the comparator circuit 22 through diode 28. Transistor $Q_4$ is normally non-conductive, and the current generated by $Q_5$ passes through $Q_3$ only. As soon as the voltage applied to terminal S reaches and passes that of terminal T, transistor $Q_4$ takes over, and $Q_3$ is cut off. When $Q_4$ starts conduction, a voltage drop develops across resistor 33 which renders the base of $Q_6$ negative in respect to its emitter, $Q_6$ is then driven to saturation applying a positive signal to the gate of $CR_{30}$, causing $CR_{30}$ to fire, and deliver an output pulse at terminal 35.

The output pulse precedes the input by a controllable time interval falling within the range of 0.5 millisecond to 1.5 milliseconds, and jitter was found to be plus or minus 1 microsecond when the repetition rate is made to change from 100 to 500 pulses per second. The circuit has been found to remain locked even when rotation period is changed at a rate of 2 octaves per second. No drift versus time was detected. Averaging of prism drum rotating speed is obtained as the result of enabling the clamp capacitor $C_2$ to charge up to lower values as drum rotational speed is increased and to higher values as prism drum rotation speed is decreased with bleed current from the capacitor being of the order of $\frac{1}{500}$ of the charging current applied to ramp capacitor $C_1$.

It can be seen from the foregoing that the present invention provides a novel electronic circuit employing single sensor means in combination with a rotating prism laser Q-switch in which the starting signals developed by the circuit are independent of prism rotating speeds and occur sufficiently in advance of prism alignment to allow for population inversion buildup and thereby yield optimum pulse amplitude and form. The output of the circuit is adequate to fire most high-power lasers.

Although this invention has been described with respect to its preferred embodiments, it should be understood that many variations and modifications will now be obvious to those skilled in the art, and it is preferred, therefore, that the scope of the invention be limited, not by the specific disclosure herein, only by the appended claims.

The embodiments of the invention in which an exclusive privilege or property is claimed are defined as follows:

1. A timing circuit for use with cycling devices to develop output pulses each occurring at a predetermined time prior to the initiating of each cycle and independent of changes in cycle duration comprising
   means for sensing the initiating of a cycle;
   a constant current source;
   an impedance circuit including a first capacitor being charged by said constant current source;
   switch means coupled to said sensing means for discharging said first capacitor upon the initiation of each cycle;
   a second capacitor;
   unilateral circuit means coupling said second capacitor to said constant current source to permit charging of said second capacitor and to prevent discharging of said second capacitor by said switch means;
   comparator means for comparing the voltage across said impedance circuit against the voltage across said second capacitor to generate an output pulse at a predetermined time prior to the initiation of the next cycle.

2. The timing circuit of claim 1 further comprising a constant current bleed circuit for bleeding current from said second capacitor.

3. The timing circuit of claim 2 wherein the constant current source charges the first capacitor at a much faster rate than the constant current bleed circuit discharges said second capacitor.

4. The timing circuit of claim 1 wherein said comparator means is comprised of first and second transistors connected to form a differential circuit;
   means coupled to the output of said differential circuit for generating an output signal upon comparison.

5. The timing circuit of claim 1 wherein said impedance circuit is further comprised of adjustable resistance means coupled to said constant current source for adjusting the advance time of the output pulse independently of prism rotation.

6. A timing circuit for use with Q-switched lasers which are comprised of at least one rotatable prism substituted for one of the parallel plane reflectors normally employed to form the laser cavity,
   a rotating drum for supporting said prism and means for rotating said drum to rotate said prism into alignment once during each cycle of rotation;
   a light source;
   a light sensor;
   means provided on said drum for permitting light from said light source to impinge upon said sensor upon prism alignment;
   a constant current source;
   an impedance circuit including a first capacitor being charged by said constant current source;
   switch means coupled to said sensing means for discharging said first capacitor upon the initiation of each cycle;
   a second capacitor;
   unilateral circuit means coupling said second capacitor to said constant current source to permit charging of said second capacitor and to prevent discharging of said second capacitor by said switch means;
   comparator means for comparing the voltage across said impedance circuit against the voltage across said second capacitor to generate an output pulse at a predetermined time prior to the initiation of the next cycle.

7. The timing circuit of claim 5 wherein the constant current source charges the first capacitor at a much faster rate than the constant current bleed circuit discharges said second capacitor.

8. The timing circuit of claim 5 wherein said comparator means is comprised of first and second transistors connected to form a differential circuit;
   means coupled to the output of said differential circuit for generating an output signal upon comparison.

9. The timing circuit of claim 8 further comprising a silicon controlled rectifier triggered by said output signal for generating an output pulse in advance of the initiation of the next occurring prism alignment.

10. The timing circuit of claim 6 further comprising a constant current bleed circuit for bleeding current from said second capacitor.

11. The timing circuit of claim 5 wherein said impedance circuit is further comprised of adjustable resistance means coupled to said constant current source for adjusting the advance time of the output pulse independently of prism rotation.

12. The timing circuit of claim 5 wherein means for attenuating said ramp signal is coupled to the output of said first capacitance for compensation of the desired advance time.

13. Means for generating advance pulses at a predetermined time prior to the occurrence of each pulse in a generated train of first pulses and independent of pulse repetition rate comprising:
   first means for generating an output having a triangular waveshape; said first means being controlled by said train of pulses to cause each of the peaks of said triangular waveshape to occur in time coincidental with each associated pulse in the train of first pulses;
   second means coupled to said first means for adding a constant signal value to said triangular waveshape output;

third means coupled to said first and second means for generating an output pulse each time the output of said second means is equal to the output of said first means thereby generating a train of output pulses each occurring in advance of an associated one of the pulses in said first train of pulses.

14. A timing device for generating advance pulses each occurring at a predetermined time prior to the occurrence of each pulse in a given pulse train, and independently of pulse repetition rate, comprising:

a function generator for generating a cycling waveform which has a linear portion vs. time and is synchronized with the given pulse train;

a fixed quantity source, a storage means for storing the cycling quantity peak, and a comparator to deliver an output pulse when the difference between the cycling quantity and its stored peak is equal to the fixed quantity.

15. The device of claim 14 further comprising a signal source driving both said fixed quantity source and said function generator for deriving the cycling function slope and the constant quantity from the same source in order to eliminate their effect on the advance time.

16. The device of claim 14 wherein said storage means includes an analog storage for the cycling quantity peak, which is charged through a unilateral device.

17. The device of claim 14 further comprising a constant bleed coupled to the storage means, causing its stored quantity value to drop in time between each of the given pulses in the pulse train to improve dynamic operation.

18. The device of claim 17 further comprising means for providing a linear drop in time of the contents in said storage means, and an attenuator for the cycling quantity coupled to said function generator to compensate for the drop and keep the advance time independent on repetition rate.

References Cited

UNITED STATES PATENTS

| | | | |
|---|---|---|---|
| 3,315,169 | 4/1967 | Nitta et al. | 307—305X |
| 3,430,101 | 2/1969 | Biltz | 315—194 |
| 3,466,472 | 9/1969 | Vandermore et al. | 307—252X |

JAMES W. LAWRENCE, Primary Examiner

E. R. LA ROCHE, Assistant Examiner

U.S. Cl. X.R.

307—269, 311; 328—63, 77, 129